United States Patent [19]

Schlanzky

[11] 3,898,892
[45] Aug. 12, 1975

[54] DIFFERENTIAL MOUNTED SINGLE STAGE DIAPHRAGM OPERATED PUMP

[75] Inventor: Manfred P. H. Schlanzky, Frankenmuth, Mich.

[73] Assignee: General Motors Corporation, Detroit, Mich.

[22] Filed: Nov. 7, 1973

[21] Appl. No.: 413,503

Related U.S. Application Data

[62] Division of Ser. No. 307,331, Nov. 16, 1972, Pat. No. 3,841,796.

[52] U.S. Cl. .................... 74/710; 280/6 R; 417/233
[51] Int. Cl.² ..... F16H 1/38; B60S 9/00; F01D 5/18
[58] Field of Search ............ 280/6, 6.1, 6.11, 124 F; 180/41; 417/233, 471; 74/13, 15.6, 710

[56] References Cited
UNITED STATES PATENTS

| 2,207,310 | 7/1940 | Ballamy | 74/711 |
|---|---|---|---|
| 2,469,181 | 5/1949 | Slater | 74/15.6 |
| 2,784,596 | 3/1957 | Franklin | 74/13 |
| 2,982,466 | 5/1961 | Pier | 280/124 F |
| 3,095,824 | 7/1963 | Elfes | 417/471 |
| 3,173,671 | 3/1965 | Broadwell | 180/41 |
| 3,344,687 | 10/1967 | Stockton | 74/710 |
| 3,470,767 | 10/1969 | Gray | 74/710 |
| 3,623,746 | 11/1971 | Zielinski | 280/12 TF |

Primary Examiner—William L. Freeh
Assistant Examiner—Gregory P. LaPointe
Attorney, Agent, or Firm—Charles R. White

[57] ABSTRACT

An air compressor having a diaphragm-piston connected to a cam operated push rod for producing a single stage compression of air through a wide range of desired static pressures in accordance with the position of an open ended housing in a support fixture which positions the push rod with respect to the high point of a cam operator to maintain a predetermined clearance volume within the pumping chamber of the compressor. Clearance volume is held by means of a clamp device for fixedly securing the axially adjusted compressor housing with respect to the cam operator.

2 Claims, 5 Drawing Figures

DIFFERENTIAL MOUNTED SINGLE STAGE DIAPHRAGM OPERATED PUMP

This is a division of application Ser. No. 307,331, filed Nov. 16, 1972 U.S. Pat. No. 3,841,796 issued Oct. 15, 1974.

This invention relates to air compressors and more particularly to air compressors of the type including a dry-diaphragm-piston which is operated through a short stroke to produce a single stage compression of fluid.

Compressed air systems used on vehicles include cam operated single stage dry diaphragm-piston compressors producing high volume discharge of compressed air for use in the systems. The advantage of such arrangements is that the diaphragm piston combination has desirable life characteristics and eliminates the need for lubricating friction surfaces of the type found between piston and cylinder compressor units.

A typical diaphragm piston cam operated single stage compressor has a fixed volumetric capacity that only can be varied by changing the volume of a pumping chamber within the device.

Certain of single stage compressors have an oil chamber on one side thereof through which oil is circulated to produce a pumping action on the diaphragm piston.

The present invention is directed to a compact, short-stroke diaphragm-piston air compressor that is cam operated to produce a single stage compression of fluid wherein the diaphragm piston is operated without circulating oil into and out of an oil-pumping chamber on one side thereof and wherein the diaphragm piston assembly is operated through an improved cam driven push rod assembly for producing positive compressor operation.

Another object of the present invention is to improve single stage diaphragm piston type compressors by the provision therein of an open-ended compressor housing that is adapted to be adjustably mounted with respect to a support pedestal having cam operated means therein so as to vary the length of stroke of a push rod to control clearance volume on the air side of the diaphragm piston thereby to control the maximum static pressure of the system.

Yet another object of the present invention is to provide an improved easily assembled, compact, short stroke diaphragm-piston single-stage air compressor having an open ended housing closed by an improved piston diaphragm assembly which includes protector plate means for protecting the diaphragm and for securing a piston for reciprocation by a push rod assembly which extends through one of the open ends of the compressor housing and wherein a combination pumping chamber and valve support plate is secured to the other open end of the compressor housing to form a pump chamber with the diaphragm piston assembly which can have the clearance volume therein adjusted by axial positioning of the open end of the housing and the push rod operator therein with respect to a drive support fixture including cam drive means therein for operating the push rod of the assembly.

These and other objects of the present invention are attained in one working embodiment which has a differential housing with a rotatable cam located therein for operating the compressor and wherein a support fixture is formed on the differential housing including an axial bore therein for supportingly receiving an axially positioned extension on an air compressor housing. The extension is open-ended and supports a reciprocating push rod assembly which is spring biased interiorly of the differential housing into operative engagement with the cam.

The housing includes an opposite open end thereon closed by an improved dry operated piston and diaphragm assembly. More particularly, the diaphragm is supported at one surface thereof by a protector plate having a peripheral edge for supportingly receiving the diaphragm adjacent a hinged peripheral edge thereon. The protector plate further includes a central connector portion thereon secured to the push rod and a plurality of circumferentially located rivets thereon each supportingly received within a counterbored opening through the piston and having head portions on the rivet deformed to fill an exposed pumping surface of the piston that is reciprocated by the piston into and out of a pumping chamber formed in a combination valve plate and cylinder head member.

The axial position of the compressor housing within the differential housing support fixture will locate the push rod with respect to the cam so that maximum amount of push rod stroke can be varied. Axial location of the push rod will cause the peak of the piston stroke to occur away from the top surface of the pumping chamber so as to increase clearance volume and consequently lower the static pressure capability of the compressor.

Further objects and advantages of the present invention will be apparent from the following description, reference being had to the accompanying drawings, wherein a preferred embodiment of the invention is clearly shown.

Figure 1:
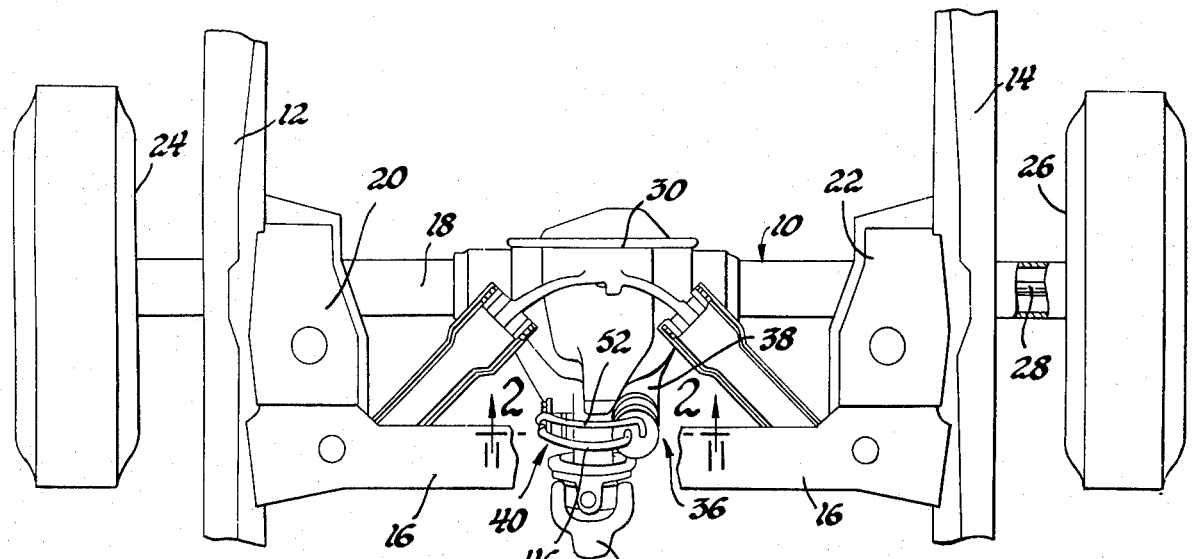
FIG. 1 is a fragmentary view partially broken away, in top elevation of a rear suspension leveling system including the air compressor and drive arrangement of the present invention.

Referring now to FIG. 1, a rear suspension 10 of a vehicle is illustrated including a chassis frame having side members 12, 14 joined together by a cross frame member 16 that overlies an unsprung axle housing 18.

Primary suspension springs (not shown) have their upper ends supported on bracket seats 20, 22 on the cross member 16. These springs support the chassis frame in sprung suspension on the axle housing 18. Ground engaging wheel assemblies 24, 26 are each driven by an axle 28. The axle in turn is operatively associated with differential gear means within a differential housing 30 located midway of the axle housing 18. Drive to the differential housing 30 is through a propeller shaft 32 connected to a differential pinion 34.

A supplemental load supporting air spring device 36 is supported between a ledge 38 on the differential housing 30 and the cross member 16. It is selectively inflated by air supply from an improved air compressor and drive assembly 40 constructed in accordance with certain principles of the present invention.

The assembly 40 includes a compressor 42 having an inlet fitting 44 thereon connected to a conduit 46 which is communicated with the exhaust from the air spring assembly 36 for returning air from the air spring to the compressor during system operation. The compressor further includes a high pressure discharge fitting 50 connected to a supply conduit 52 through which air is supplied to an inlet or inflation port on the air spring assembly 36.

In accordance with certain principles of the present invention, the compressor and drive assembly 40 is operated only in response to vehicle operation when the cam pinion 34 is operated to drive a cam 53 connected thereto. The cam 53 operates a compressor drive mechanism 54. The compressor drive mechanism 54 operates a combination diaphragm and piston assembly 56 with respect to a valve and pumping chamber assembly 58 which includes means for controlling fluid flow into and out of compressor 42 so as to produce a continuous flow of compressed air into the air spring 36 during vehicle operation.

A valve mechanism (not shown) in the air spring assembly 36 is operated to bleed excess air flow from the air spring 36 during continuous flow of compressed air thereto. The excess air flow is thence discharged and returned through the inlet conduit 46 to complete a closed loop continuous operation.

For purposes of the present invention, the aforedescribed description of the system will suffice. For further details of the closed loop system of this type, reference may be had to copending U.S. Application Ser. No. 307,378, filed Nov. 17, 1972, by Robert E. Owen, entitled "Leveling System with Center Mounted Air Spring."

One feature of the present invention is the manner in which the compressor 42 is mounted with respect to the differential housing 30. The differential housing 30 more particularly includes a side mounting flange 60 which has an axial bore 62 therethrough. A tubular extension 64 defines one open end on a compressor housing member 66. It is supportingly received within the bore 62 and is sealed with respect thereto by an O-ring 68 supported in the extension 64 to be located in sealing engagement with the surface of bore 62. The extension 64 is axially positionable within the bore 62 so as to locate the spherical end 70 of an elongated push rod 72 of the drive mechanism 54 axially with respect to the bore 62 so as to be either spaced from or located in engagement with the low point of the cam 53. The compressor shell or housing 66 is then fixedly secured with respect to the flange 60 by suitable clamp means to maintain the desired stroke relationship. By controlling the length of stroke of the push rod 72, the piston and diaphragm assembly 56 is positioned at the end of the stroke so that the piston will be spaced closer or farther away from the top of a pumping chamber 74 formed in the combination valve and cylinder head 58. The positioning of the peak of the piston stroke with respect to the pumping chamber surface will produce a controlled clearance volume which constitutes the amount of air remaining in the pumping chamber 74 when the piston and diaphragm assembly 56 has reached the peak of its stroke. By spacing the peak of the stroke away from the top surface of the pumping chamber 74 the clearance volume will be increased to cause a controlled reduction of the maximum static pressure output of the compressor. In order to adjust the compressor 40 with respect to the cam 53 to control the amount of volumetric efficiency the compressor is forced against the high point of the cam 53 until the diaphragm piston assembly 56 is in solid contact with an upper surface 76 of the pumping chamber 74. An axial force 77 is gradually removed from the pump installation and an indicator will establish a calculated piston postion to maintain a desired clearance volume required to produce a given static output pressure. At this point, the air compressor is fastened securely in its axial location so as to maintain the desired clearance volume control.

In the illustrated arrangement, the compressor housing 66 is sealed with respect to the flange 60 following adjustment by means of a large diameter resilient O-ring 78 seated between the end of flange 60 and a shoulder 79 on housing 66.

The compressor housing 66 includes an inner opened end 80 in which is supportingly received a bearing sleeve 82 elongated to extend outwardly of end 80. More particularly, the bearing sleeve 82 includes a head portion 84 having the outer periphery thereof supported within the end opening 80. It in turn includes a plurality of circumferentially spaced holes 86 therein. In one working embodiment there are nine circumferentially spaced holes that provide unrestricted flow of air through the end opening 80 to and from an open end 87 on the opposite end of the housing 66 closed by the piston and diaphragm assembly 56 and located to permit suction movement of the assembly 56 with respect to the housing 66.

The piston and diaphragm assembly 56 seals the opened end 87 and is connected to the push rod 72 to be reciprocated thereby into and out of the opened end 87 and into and out of the pumping chamber 74 to produce a single stage compression of fluid on one side of the assembly 56.

The assembly 56 more particularly includes a protector plate 88 which has a tubular extension 90 centrally formed on one side thereof which is rolled inwardly at 92 to interlock within a groove 94 on the end of the push rod 72. Radially outwardly of the central connector 90 the plate 88 has a plurality of circumferentially formed rivets integrally located thereon each directed through a countersunk opening 96 within a piston disc 98. Head portions 100 on each of the rivets 94 are deformed so as to form a flat continuously level surface at each of the countersunk openings 96 which define a continuous uninterrupted surface across the full planar extent of the front 102 of the piston disc 98.

A flexible diaphragm 104 in the assembly 56 is supported between the protector plate 88 and the rear surface of the piston disc 98. It has a radially outwardly located hinged edge 106 thereon held in sealing engagement between an annular flange 108 on the housing 66 and an annular end face 110 formed on the valve and cylinder head 58. The edge 106 is secured in sealing relationship therebetween by a sheet metal cover 114 that has a radially inwardly bent edge 116 thereon overlying a chamfered surface 118 on the outer surface of the housing 66. It further includes an outer wall portion 120 which is located against an annular outer face 122 of the head 58 where it is sealed by an O-ring 124. This defines a high pressure cavity 126 that is communicated through a tube member 128 with the high pressure fitting or discharge fitting 50. Within the high pressure chamber 126 is located a discharge valve disc 130 having its outer periphery overlying and closing a plurality of circumferentially located discharge openings 132. The disc 130 is held in place by a rivet 134 to seal the discharge openings 132. Upon movement of the piston disc 98 into the pumping chamber 74 fluid is compressed to act on the valve disc 132 to force it into supported relationship with a deflector plate 136 so as to allow flow from the pumping chamber 74 through the discharge openings 132 thence through the tube 128 and outwardly of the discharge conduit 52. This compression stroke is produced by rotation of the high point of the cam 36 against the spherical surface 70 on push rod 72. The compression stroke or return stroke of the push rod 72 is produced by a return spring 138 which is of conical configuration including a small diameter end 140 thereon supported against a retaining ring 142 on the end of the push rod 72. A large diameter end 144 of the spring surrounds the bearing sleeve 82 and is located in engagement with the sleeve head 84 so as to force the push rod 72 outwardly of the sleeve 82 against the outer surface of the cam 53. Thus it serves as a return mechanism for the diaphragm and piston assembly 56. In the illustrated arrangement, the outer periphery of the push rod 72 includes a peripheral groove 146 therein that directs lubricant from the sump chamber 148 within the housing 30 along the bearing surface of the bearing extension 82 upon opposite reciprocation of the push rod 72 therein.

During the movement of the piston and diaphragm assembly 56 to the right, as produced by the return spring 144, the volume of the pumping chamber 74 is increased by movement of the piston disc 98 away from the inner surface 76 of chamber 74. This causes a valve suction valve disc 150 to move away from suction ports 152 in the valve and cylinder head 58. In the illustrated arrangement, a rivet 154 secures the suction valve disc 150 in place on the inner surface of the pumping chamber 74. A suction cavity 156 is formed in the outer wall of the head 58 in communication with the suction openings 152. It is communicated through a tube 158 with the suction fitting 44.

Figure 2:
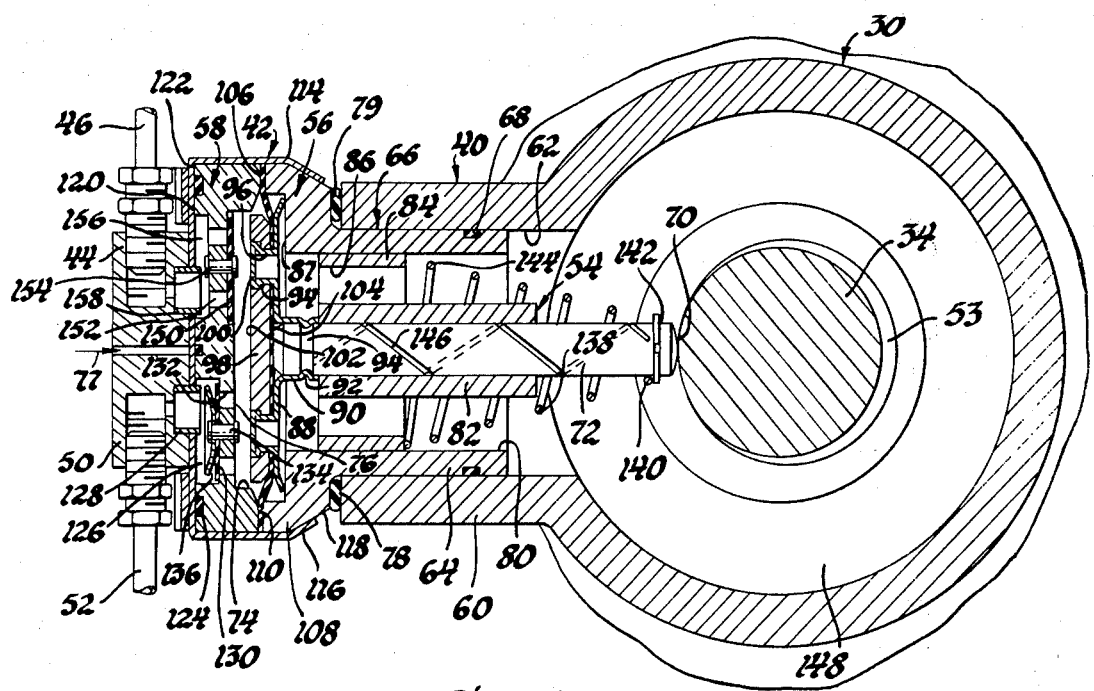
FIG. 2 is an enlarged vertical sectional view taken along the section line 2—2 of FIG. 1.
Figure 3:
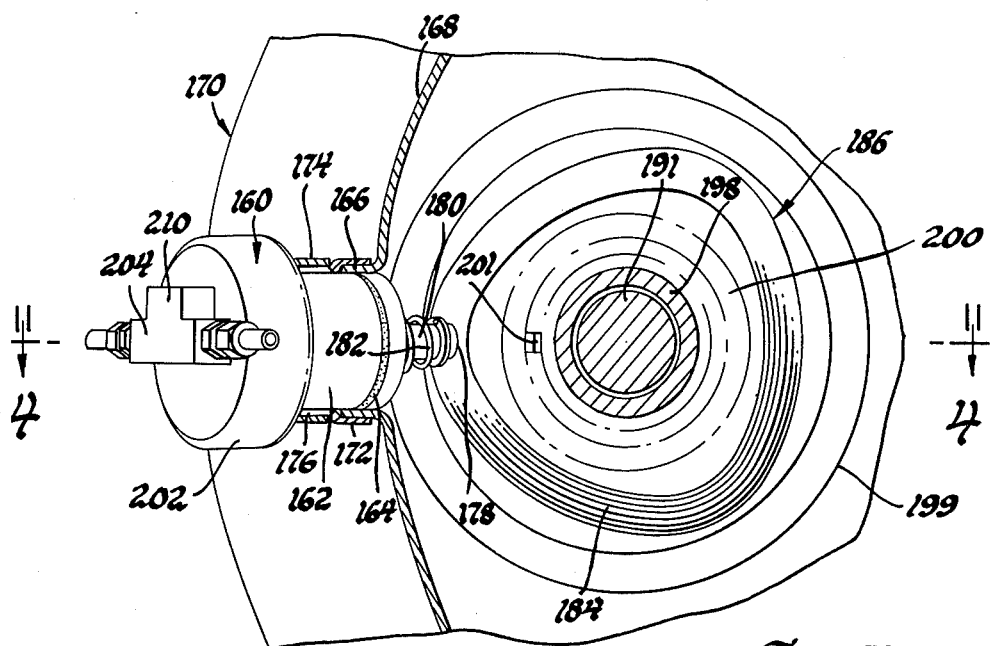
FIG. 3 is a fragmentary sectional view showing a further embodiment of the present invention.
Figure 4:
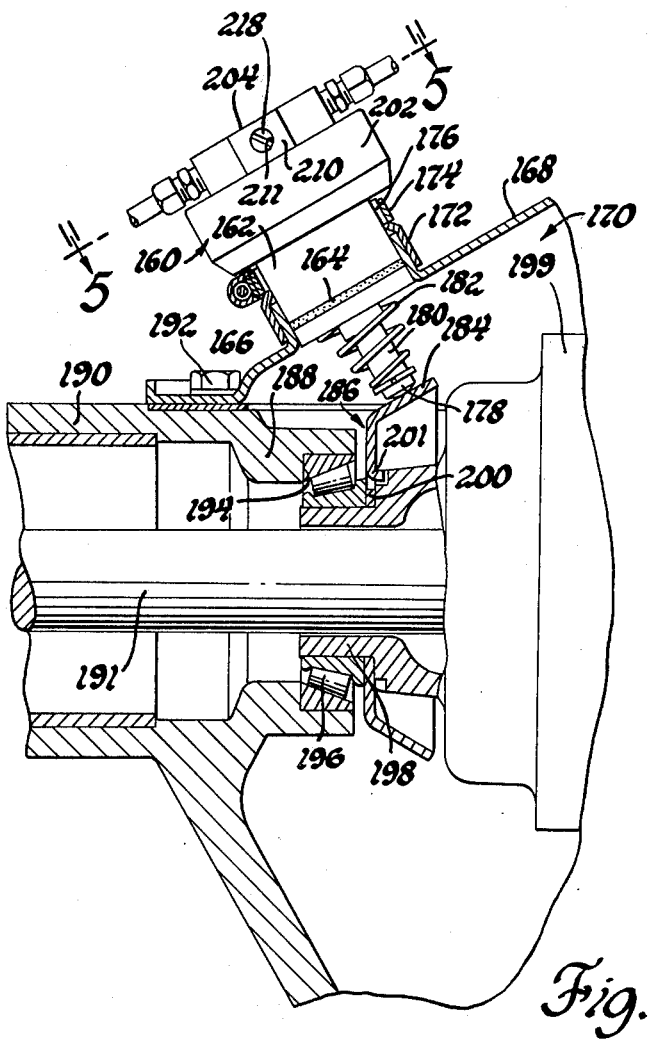
FIG. 4 is a view in vertical section taken along the line 4—4 of FIG. 3 looking in the direction of the arrows.
Figure 5:
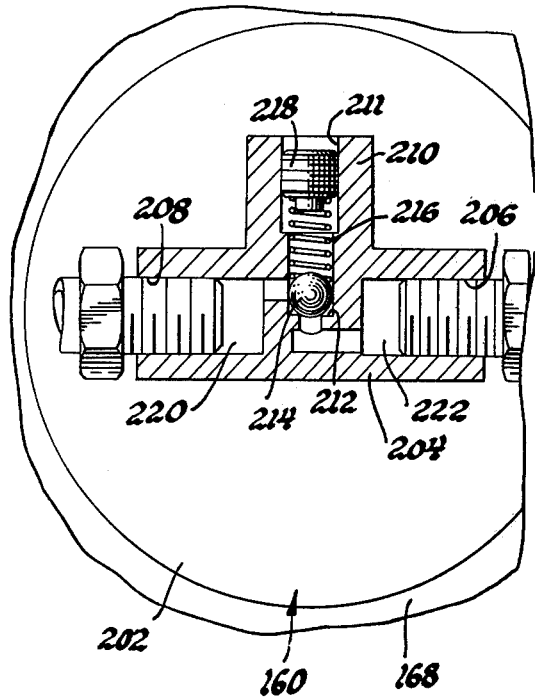
FIG. 5 is a section along line 5—5 of FIG. 4.

The embodiment illustrated in FIGS. 3 and 4 shows a compressor assembly for use in a rear suspension leveling system like that shown in FIGS. 1 and 2. The compressor assembly 160 includes a housing shell 162 corresponding to the housing 66 in the first embodiment. It carries an annular O-ring 164 for sealing against a support fixture defined by an upstanding support flange or collar 166 on an inclined side surface 168 of a differential housing 170. The housing is fixedly secured in place by means of a sleeve 172 and a clamp ring 174. The sleeve 172 includes a plurality of axial slots 176 located circumferentially therearound for gripping the outer surface of the housing 162 so as to hold it axially to locate the spherical end 178 of a push rod 180 corresponding to the push rod 72 in the first embodiment.

In this arrangement, the push rod 180 is biased inwardly by a return spring 182 against an inclined surface 184 having a plurality of lobes formed thereon of a differential case cam 186. The inclined surface 184 is formed generally parallel to the inclined side surface 168 of the differential housing.

Side surface 168 is located at one side of the differential housing which supportingly receives the inner end 188 of an axle housing 190 for an axle 191. The inner end is secured in place on the differential housing 168 by suitable fastening means such as bolts 192. The inner end 188 of the axle housing 190 is counterbored at 194 to supportingly receive a shaft bearing assembly 196 which supports a bearing surface 198 on the differential case 199 for rotation with respect to the axle housing 190. The cam 186 has an annular base portion 200 thereon seated on the surface 198, where it is fixedly secured by a tang 201 against rotation with respect to the surface 198. The arrangement permits inclusion of a compressor operating cam within the differential housing 168 without requiring modification of existing differential mechanisms within the housing 168. By virtue of the aforedescribed arrangement, the compressor 160 can be located with respect to a housing out of the way of operative components thereof and the location of the cam on the differential case permits an inclined surface thereon to be located parallel to the normal differential housing configuration so as to position the end 178 of the push rod 180 in a perpendicular relationship to the drive cam surface thereby to reduce side thrust on the push rod.

In the embodiment of FIGS. 3 and 4, the pump has working components like those shown in FIG. 2. It includes an outer cover 202 which joins a valve head pump chamber to an open ended pump or compressor housing. In this arrangement a common header with calibrated pressure relief valve is included. The header is illustrated at 204 and includes a discharge end 206 and an inlet end 208 thereon. An offset leg 210 includes a relief valve bore 211 having a valve seat 212 with a ball 214 spring biased thereon by a spring 216 which is adjusted to produce a predetermined relief valve calibration on the ball 214 by means of a calibration screw 218 threadably received in bore 211. The valve seat 212 is formed between offset passageways 220, 222 which communicate the outlet port 206 with the inlet port 208 when the predetermined maximum pressure condition within the discharge side of the system moves, the ball from the relief valve seat 212 thereby causing the high pressure buildup to bypass directly back to the suction side of the compressor for relieving the system.

The detailed description of the preferred embodiment of the invention for the purpose of explaining the principles thereof is not to be considered as limiting or restricting the invention, since many modifications may be made by the exercise of skill in the art.

What is claimed is:

1. An air compressor and drive assembly for a vehicle leveling system comprising an outer housing for a vehicle drive differential, said outer housing having an inclined support surface with an enlarged opening therein, a flange projecting outwardly from said outer housing around the periphery of said opening, a differential drive pinion rotatably supported in said outer housing, a differential case operatively connected to said differential drive pinion rotatably mounted in said outer housing, a tubular axle housing secured to said outer housing and extending outwardly therefrom, said differential case having a projecting cylindrical shoulder portion extending into one end of said axle housing for rotation therein, bearing means operatively mounted between said axle housing and said projecting cylindrical shoulder portion for rotatably supporting said differential case in said outer housing, a cup shaped cam secured to said differential case adjacent to said shoulder portion for rotation therewith, said cam having an inclined peripheral surface with plurality of spaced camming lobes formed thereon, said peripheral surface of said cam being generally parallel to said inclined support surface of said outer housing, air compressor means for the vehicle leveling system, said compressor including a compressor housing externally mounted with respect to said outer housing, said compressor housing having projecting shell portion extending into said opening and secured to said support flange, a reciprocating drive shaft extending from said compressor housing interiorly of said outer housing, said drive shaft including an inner end thereon engageable with said inclined cam surface, spring means for biasing said reciprocating shaft against said inclined surface of said cam, said cam rotating in response to rotation of said differential casing to cause reciprocation of said shaft against the force of said spring means, said compressor means including means responsive to reciprocation of said shaft for continuously compressing air during operation of said differential drive pinion and rotation of said differential case.

2. An air compressor and drive assembly for a vehicle leveling system comprising an outer housing for a vehicle drive differential, said outer housing having an inclined and curved support surface, said surface having an enlarged circular opening therein having an axis substantially perpendicular to said surface, a flange projecting outwardly from said outer housing around the periphery of said opening, a differential drive pinion rotatably supported in said outer housing, a differential case operatively connected to said differential drive pinion rotatably mounted in said outer housing, a tubular axle housing secured to said differential case and extending outwardly therefrom, said differential case having a projecting cylindrical shoulder portion extending into one end of said axle housing for rotation therein, bearing means operatively mounted between said axle housing and said projecting cylindrical shoulder for rotatably supporting said differential case in said housing, a cup shaped cam secured to said shoulder portion for rotation therewith, said cam having an inclined annular peripheral surface with plurality of spaced camming lobes formed thereon, said peripheral surface of said cam being generally parallel to said support surface of said outer housing, air compressor means for the vehicle leveling system, said compressor having a housing with a projecting cylindrical mounting portion extending into said opening, clamping sleeve means securing said cylindrical mounting portion to said support flange, a unitary reciprocating drive shaft extending from said compressor housing interiorly of said outer housing, said drive shaft including an inner end thereon engageable with said inclined cam surface, spring means for biasing said reciprocating shaft against said inclined surface of said cam, said cam rotating in response to rotation of said differential casing to cause reciprocation of said shaft against the force of said spring means, said compressor means including means responsive to reciprocation of said shaft for continuously compressing air during operation of said differential drive pinion and rotation of said differential case.

* * * * *